UNITED STATES PATENT OFFICE.

CHARLES C. MOORE, OF WASHINGTON, DISTRICT OF COLUMBIA, ASSIGNOR OF ONE-HALF TO FREDERICK C. STEVENS, OF ATTICA, NEW YORK.

PROCESS OF MAKING STARCH AND PRODUCTS THEREOF.

1,224,951.          Specification of Letters Patent.          Patented May 8, 1917.

No Drawing.          Application filed December 16, 1911.   Serial No. 666,161.

*To all whom it may concern:*

Be it known that I, CHARLES C. MOORE, a citizen of the United States, residing at Washington, in the District of Columbia, have invented certain new and useful Improvements in Processes of Making Starch and Products Thereof, of which the following is a specification.

This invention relates to processes of making starch and products thereof; and it comprises a method of making starch from potatoes wherein potatoes are coarsely comminuted, dried, reground to fine form, starch milk prepared therefrom and starch extracted from the milk, the coarsely comminuted potatoes being advantageously treated with an enzym-arresting agent prior to the drying operation; and it also comprises as a new article comminuted desiccated potato containing an enzym-arresting material uniformly distributed therethrough and having its natural constituents in an unhydrolyzed form and giving upon grinding and settling a greater proportion of heavy starch than similar potato material in its natural or undesiccated condition, said comminuted desiccated potato material being substantially unbrowned and unblackened; all as more fully hereinafter set forth and as claimed.

Ordinary, or "Irish", potatoes are of course a good starch-making material and they are largely used for that purpose, it being customary to pulp or otherwise comminute the fresh tubers and after washing out on sieves for the purpose of obtaining a starch milk, to gravitally separate the starch from the milk on starch settling tables. The potato carries about 75 per cent. of water and several hundred per cent. more must be applied in the pulping process. The result is a very high dilution of the soluble matter contained in the potato. This soluble matter approximates 20 per cent. of the total dry weight of the potato. It is desirable to recover this soluble matter and prepare food products from it since it is of nutritive value while sending it to waste creates a nuisance; but its extreme dilution in the usual starch waters renders this expensive or impracticable. A more serious difficulty in the usual method is that it is in practice impossible to recover more than about 75 per cent. of the starch shown in the potato by analysis. Part of the loss is probably due to inclusion of fine starch granules by flock and "gluten" as well as by cellular tissue which has escaped disruption in the grinding. It is not feasible to grind potatoes to extreme fineness by the wet methods in use as the fiber and tissue, when wet, are of a spongy nature. Another part of the loss is due to the fact that not all the starch actually present in the raw potato is in a completely ripened, dehydrated heavy form, some of it existing in what may be called an immature form and still containing water of constitution. These hydrated forms of starch are not as heavy as mature starch and do not separate well with it on starch tables.

I have discovered that I can materially increase the yield of commercial starch from common potatoes by intercalating a drying step between the first comminution or grinding of the tubers and the final steps of preparing starch milk and recovering starch therefrom; and can also obtain certain other advantages. If the potatoes be coarse ground, grated, chipped or sliced and then dried, dry grinding to any fineness desired becomes practicable. With fine dry grinding much of the starch which would otherwise escape settling in the starch milk because of inclusion in cellular elements becomes recoverable on the starch tables, increasing the yield to that extent. Furthermore, in the drying operation immature light hydrated starch granules lose their moisture of constitution and become like the starch of dry grains, heavy and settling well in water. This also contributes to an increase in yield.

With dry very fine potato material the amount of water necessary to wash the starch from the fibrous matter is much diminished and concomitantly the concentration of the waste effluent from the starch tables is much increased, rendering more practicable commercially its concentration for food purposes, either as cattle food or human food. In practice I have found it desirable to subject the finely ground dried potato product to a preliminary steeping process, prior to making starch milk and washing the product on sieves for the separation of the starch. This steep liquor may be drawn off and concentrated or it may be run into the effluent of wash waters used in separating the starch. Since this effluent then represents all that is in the potato save the starch which has been abstracted and removed, the concentrated product represents, so to speak, a concentrated nitrogenous product. It may be employed as a cattle food or as a raw material for producing articles intended for human consumption, such as soup stock. The effluent may be directly evaporated down in suitable evaporating apparatus, or it may be strained, filtered or filter-pressed to recover insoluble matters, the clear liquid concentrated to a syrup, united with the insoluble matters and the assemblage dried.

Potato tubers, like many other succulent vegetable tissues, contain a plurality of enzyms having functions in the vital operations of the tissues. Upon cutting or disintegration of the tuber these enzyms operate in various ways upon the various substances present. These actions are deleterious to the character of material for starch making purposes and in drying in the present invention it is desirable that the drying be hastened as much as possible to cut short enzymic action. The drying must of course not be at a temperature sufficient to convert, "gelatinize" or hydrolyze starch. Any hydrolyzed or converted starch cannot of course be recovered on the starch tables; neither is it a desirable component of commercial starch. Drying should therefore be at low temperature and as quick as possible. Any of the commercial forms of driers may be employed for the present purposes if operated at sufficiently low temperatures and with sufficient rapidity. Air drying at common temperatures with potatoes not treated to arrest enzymic activity is much less desirable.

Among the enzyms are bodies which tend to cause absorption of oxygen from the atmosphere with browning or blackening of the tissues and contained starch. This discoloration is much facilitated by the presence of iron which is inevitably dissolved from cutting tools in comminution of the tubers.

For the foregoing reasons it is very advantageous to treat the potatoes during or shortly after the first comminution with a body or substance having the power of arresting enzymic activity. While many other substances, such as alkaline carbonates and hydrates in dilute solution, lime, various acids, such as sulfurous acid, etc., may be employed, I find that a sufficient degree of activity coupled with certain other desirable effects for this purpose is possessed by the bisulfites. Bisulfite of lime is particularly advantageous. Bisulfite of soda or bisulfite of calcium ("bisulfite of lime") may be employed, being sprinkled in the solid or dissolved form over the potatoes during or immediately after the comminuting action. Very little bisulfite is needed for the present purposes, as little as one pound of sodium bisulfite being all that is necessary for 400 or 500 pounds of potatoes. The bisulfites have the further advantage for the present purpose in that in addition to their enzym-arresting power they also restrain fermentation by organisms, preventing souring by the formation of lactic acid, alcoholic fermentation and the like. This is particularly desirable where, for any reason, the period of drying is long. With the aid of bisulfites, the potatoes may be air dried at common temperatures if desired without suffering deterioration.

If the potatoes are allowed to brown or blacken in drying to any extent the starch recovered will be off-color.

The bisulfites, for the present purposes, have a further advantage in that they appear to facilitate the conversion of the immature forms of starch into the heavy, easily recoverable mature forms, thereby increasing the yield of commercial starch. The hydrated immature forms of starch in the presence of bisulfites do not dry down to give horny converted products. These actions are probably due to the power of bisulfites of combining with aldehydic and ketonic bodies. The carbohydrates contain aldehyde or ketone groups.

In the starch making operation the presence of a slight amount of bisulfite is quite desirable since it prevents fermentation and souring occurring during the steeping and starch recovering operation. The presence of sulfite or bisulfites in the small amount used is immaterial as regards the composition of the waste water effluent of the tables where such effluent from the starch tables is to be concentrated and used as a cattle food. Should its removal however be desirable, this can be easily effected by acidulating the liquid slightly during concentration, as by acidulating it by a little hydrochloric acid. Using sodium bisulfite, this results in the formation of a little common salt (sodium chlorid) with liberation of sulfur dioxid as a gas. Or, a portion of starch milk may be allowed to sour slightly with formation of lactic acid, and this sour liquid may be added to the effluent from the starch table before or during concentration. The lactic acid will expel the sulfur dioxid.

In an advantageous form of the present invention, I take potatoes and comminute them in any suitable way, as by chopping, grating, slicing, etc. The comminuted material emerging from the machine used may be sprinkled with the sodium or calcium bisulfite, and may thereafter be dried as a whole in any convenient manner. By treating the comminuted material inpregnation becomes, for the present purposes, substantially uniform. In the presence of bisulfite, drying may be readily effected in the sun or by air of normal temperature, without fear of souring or blackening or other fermentation or enzymic actions. Where the enzym-retarding body, such as bisulfite, is absent, drying must be relatively rapid and occur soon after comminution. The temperature of drying should be below the gelatinizing point of starch; that is, should not at a maximum go over 60° C. Air of a temperature somewhat hotter than this may be used for drying in the first stages since the development of vapor prevents the starchy material reaching the temperature of the air. As the moisture evaporates, the material becomes less sensitive to heat, and it may be finished relatively warm. However dried, it should be in a completely dry condition. This insures dehydration of immature starch and allows very fine grinding in the next stage. So dried, and particularly in the presence of the sulfite, the potato material will store indefinitely or ship any distance. The dry material is next ground to a fine flour or meal in any suitable type of mill or machine. The finer the grinding, ordinarily, the better are the results. The fine ground material is now steeped with water, which may have a little sulfur dioxid or bisulfite added to it. The mixture or magma is then sieved to obtain a starch milk which is then treated on tables in the usual way to recover starch.

Useful effects of the intermediate drying operation are evinced when the sulfite is not used; but for the stated reasons it is very advantageous to combine the sulfite treatment with the drying as it tends to increase the yield of starch and give a better colored starch.

The effluent from the starch table may be, as stated, filtered and evaporated to a syrup, such syrup being if desired, united with the fibrous matter left in the sieves and the two dried down together. Or, as the material has been very finely ground, the effluent coming from the tables may be simply concentrated as such in any type of vacuum apparatus. If the presence of a little sulfite in the material is not undesirable, as in cattle foods, it may simply be allowed to remain. Otherwise, during the concentration a little hydrochloric or lactic acid may be used to expel the sulfur dioxid.

The bisulfite operates effectively to restrain enzymic activity during the operation and the residual bisulfite remaining in the dry preparation operates in the same manner after the regrinding when the material is once more wetted in making the starch milk. Drying at low temperatures, such as must be used in the present invention does not destroy enzymic activity altogether and such activity may be resumed when the material is once more wetted to make the starch milk. The presence of the bisulfite operates to prevent this resumption of activity.

The treatment of sensitive succulent vegetable materials with an enzym-antagonistic chemical preparatory to drying and thereafter making starch, I do not claim broadly in the present application, it forming the subject-matter of my prior and co-pending application Serial No. 490,411.

The process of preliminarily drying succulent starch-yielding vegetable matters generally, fine-grinding while dry and then recovering the starch after forming a starch milk, I do not claim broadly herein, this forming the matter of certain claims in my co-pending application Serial No. 743,066, filed January 20, 1913.

What I claim is:—

1. The process of treating potatoes which comprises impregnating the same in a comminuted state with an enzym poison, desiccating the whole mass and recovering starch.

2. The process of treating potatoes which comprises impregnating the same in a comminuted state with a composition comprising $SO_2$, desiccating the whole mass and recovering starch.

3. In the manufacture of valuable products from potatoes, the process which comprises comminuting potatoes, desiccating, regrinding, converting the reground material into a starch milk and recovering starch therefrom.

4. In the manufacture of valuable products from potatoes, the process which comprises comminuting potatoes, desiccating in the presence of an enzym-arresting agent, regrinding, converting the reground material into a starch milk and recovering starch therefrom.

5. In the manufacture of valuable products from potatoes, the process which comprises comminuting potatoes, desiccating, regrinding, converting the reground material into a starch milk, recovering starch therefrom and concentrating the effluent to form a food product.

6. In the manufacture of valuable products from potatoes, the process which comprises comminuting potatoes, desiccating in the presence of an enzym-arresting agent to a dry condition, regrinding, converting the reground material into a starch milk, recovering starch therefrom and concentrating the effluent to form a food product.

7. As a new article, comminuted desiccated potatoes containing an enzym-arresting chemical uniformly distributed therethrough, having their natural constituents in an unhydrolyzed light colored form and giving upon regrinding and wet settling a greater proportion of heavy starch than the original undesiccated potato material.

8. As a new article, comminuted desiccated potatoes containing a bisulfite, having their natural constituents in an unhydrolyzed light colored form and giving upon regrinding and wet settling a greater proportion of heavy starch than the original undesiccated potato material.

9. The process of treating potatoes which comprises impregnating the same in a comminuted state with a bisulfite, desiccating the whole mass and recovering starch.

10. The process of treating potatoes which comprises impregnating the same in a comminuted state with calcium bisulfite, desiccating the whole mass and recovering starch.

In testimony whereof, I affix my signature in the presence of two subscribing witnesses.

CHARLES C. MOORE.

Witnesses:
M. C. MASSIE,
JOHN H. SIGGERS.